S. E. PARKS.
WASHER.
APPLICATION FILED OCT. 28, 1918.
1,368,525.
Patented Feb. 15, 1921.
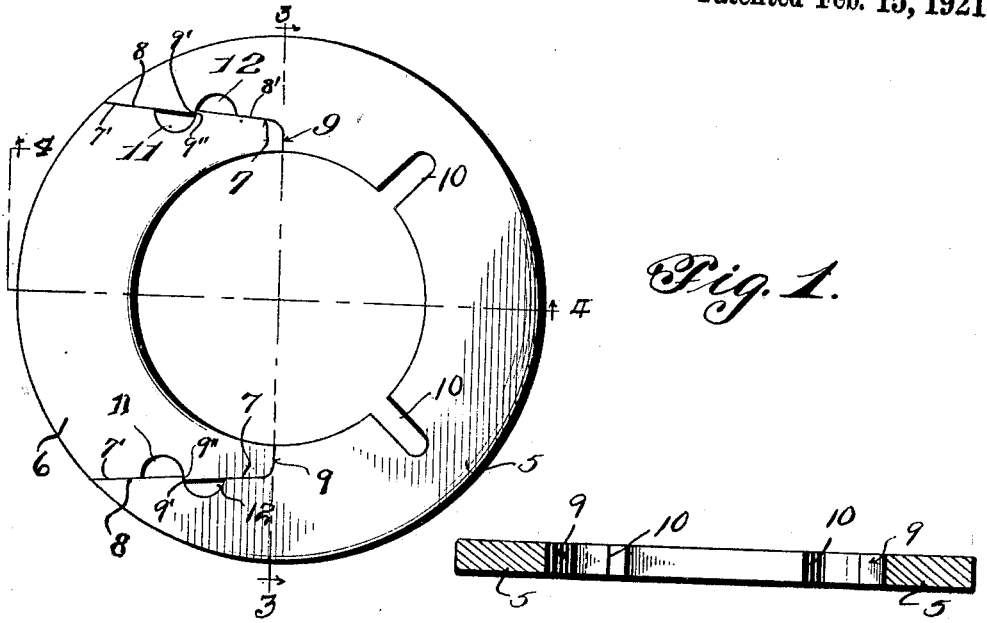
Fig. 1.
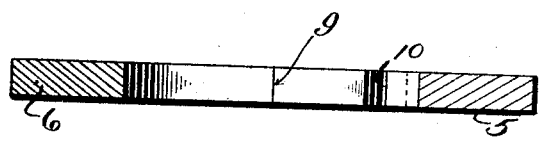
Fig. 3.
Fig. 4.
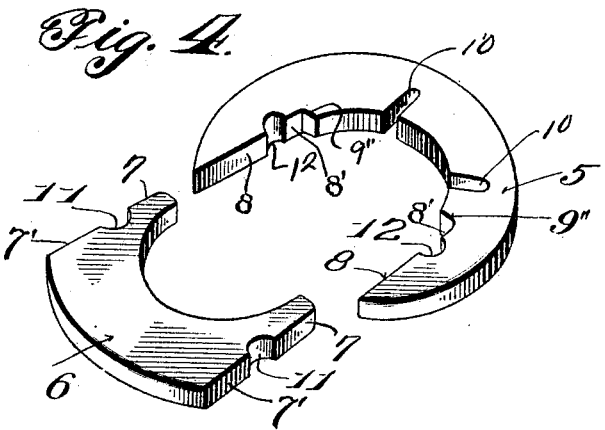
Fig. 2.
Witnesses
Inventor
S. E. Parks.
by
Attorneys

UNITED STATES PATENT OFFICE.

STEPHEN E. PARKS, OF PILLAGER, MINNESOTA.

WASHER.

1,368,525.   Specification of Letters Patent.   Patented Feb. 15, 1921.

Application filed October 28, 1918. Serial No. 259,984.

*To all whom it may concern:*

Be it known that I, STEPHEN E. PARKS, a citizen of the United States, residing at Pillager, in the county of Cass, State of Minnesota, have invented certain new and useful Improvements in Washers; and I do hereby declare the following to be a full, clear, and exact description of the invention, such as will enable others skilled in the art to which it appertains to make and use the same.

This invention relates to washers such as are placed on shafts between two bodies mounted on the shaft and with the object of holding the bodies in spaced relation, and the object of the invention is to provide a construction including a plurality of parts, which may be readily assembled upon the shaft after the spaced bodies are in position thereon and furthermore which, when assembled, will have a mutual locking engagement to hold them securely in place.

With the further object of producing a split washer of this kind which may be slipped onto a shaft transversely and will fit the same closely, the construction includes a body portion provided with a radial opening whose throat occupies half of its inner periphery and whose mouth extends through substantially a quarter of its outer periphery, the walls converging slightly from said mouth and having abrupt abutments at said throat.

The invention also contemplates the use of a complementary segment or key of a size and shape to fill said opening, its walls and those of the body portion being provided with locking shoulders which engage when the tips of the key contact with said abutments.

In the drawings:

Figure 1 is an elevation showing the washer with its parts assembled, the interlocking shoulders being somewhat exaggerated to clearly illustrate the interlock.

Fig. 2 is a perspective view showing the washer with its parts disassembled and ready to be slid into mutual engagement.

Fig. 3 is a section taken diametrically of the washer on the line 3—3 of Fig. 1, which is at right angles to the direction of sliding movement of the parts into their mutual engagement.

Fig. 4 is a sectional view taken diametrically of the assembled washer on line 4—4 of Fig. 1, which is at right angles to the section of Fig. 3.

Referring to the drawings, the washer, when assembled, is in the form of a ring as is usual. The ring includes two segmental members 5 and 6 of which the major member or "body" 5 has an angular extent of approximately 270 degrees, in the structure which it has been elected to illustrate, the complementary minor segment or "key" 6 being approximately 90 degrees, on their outer peripheries.

The inner periphery of the segment 5 has an angular extension of approximately 180 degrees as has also the inner periphery of the segment 6.

The walls of the opening through the major segment 5 extend from the outer periphery of the segment with slight convergence until near to that diameter of the segment (3—3 of Fig. 1) which is at right angles to the bisector of the angle of this convergence, from which points they extend toward each other on lines substantially radial to the segment and coincident with said diameter to the inner periphery of the segment in what I will call abutments 9 at the throat of the opening in the body 5, facing toward the mouth of such opening.

Each of said walls is by preference flat except as to be specified, and made in two planes which are slightly out of alinement with each other, the outer plane 8 extending from the periphery inward substantially halfway to the abutment and the inner plane 8' extending the remainder of the distance. The offsetting of the inner plane from the line of the outer plane produces a shoulder 9' facing inwardly; and, to accentuate this shoulder, to permit it to function, to provide clearance and prevent accumulations on its working face, and to impart resilience to this arm of the body, a segmental recess 12 is cut in said arm with its mouth opening through the face of the inner plane 8' next to said shoulder.

The key segment 6 is by preference of the same material and thickness as the major segment or body 5 and is intended when in place to complement the opening in said body so that the washer will be strictly annular. For this purpose its edges converge inwardly on lines approximating the convergence of the walls of said opening, and each edge is made in two planes and flat excepting as will be specified. That is to say, the outer plane 7' extends from the periphery of the key inward a distance to overlie the outer plane 8 in the opening, and the inner plane 7 extends for the remainder of the distance along that edge of the key to overlie the plane 8', the tips of the key segment contacting with the abutments when the parts are assembled as seen in Fig. 1. Cut through the material of the key at each side is a segmental recess 11 whose mouth opens through its outer plane, the inner end of the mouth being coincident with the shoulder 9" which results from the offsetting of the two planes 7 and 7', and these recesses are the same to the key segment as the recesses 12 are to the body segment.

With this construction, when the key is passed into the opening in the body, it does not of course at first touch either wall thereof because the distance across the inner ends of its inner planes 7 is less than the space between the outer ends of the outer planes 8 in the edges of the opening. As the key passes farther inward, its narrow end may touch the edges of the opening at the inner ends of the outer planes 8 where the shoulders 9' occur, and as it is moved yet farther inward the inner planes 7 contact with said shoulders and force them apart, both sections springing a little to permit this. Finally the outer or wider ends of said inner planes 7 are forced past the shoulders 9', when the arms of the body segments spring inward and its shoulders automatically engage behind the shoulders 9" just at the moment that the tips of the key come into contact with the abutments 9. In order that such entry of the key segment may be facilitated, the body segment 5 is provided with radial weakening notches 10 in its inner periphery of sufficient size to insure springing apart of the walls of its opening under the influence of the wedging action of the key when it is forced therebetween. Immediately that the shoulders 9" pass beyond the shoulders 9', the end portions of the body spring toward each other to engage the shoulders 9' behind the shoulders 9" and lock the key securely against withdrawal diametrically of the completed washer.

What is claimed is:—

1. The herein described two-part washer comprising a body having through one side an opening whose walls converge inwardly and are each in two planes with an inwardly facing shoulder between the planes; and a key of a size to enter said opening, its edges converging and each being in two planes with an outwardly facing shoulder between the planes and its shoulders engaging those on the body when its planes overlie the respective planes of the walls of said opening.

2. The herein described two-part washer comprising a body having through one side an opening whose walls are in two planes with a recess at their juncture producing a shoulder facing inwardly, and abutments at the inner ends of said walls; and a key complementing said opening, each of its edges being in two planes with a recess at the juncture of the planes producing a shoulder facing outwardly, its shoulders engaging those on the body when the tips of the key contact with said abutments and its planes overlying the respective planes of said walls.

3. The herein described two-part washer comprising a body having through one side an opening whose walls converge inwardly and are each flat except for a segmental recess producing a shoulder facing inwardly, and abutments at the inner ends of the walls; and a tapering key complementing said opening, each of its edges being flat except for a segmental recess producing a shoulder facing outwardly, its shoulder engaging those on the body when the tips of the key contact with said abutments.

In testimony whereof I affix my signature, in the presence of two witnesses.

STEPHEN E. PARKS.

Witnesses:
M. M. McNair,
Nellie D. McNair.